United States Patent [19]
Collins

[11] 3,786,504
[45] Jan. 15, 1974

[54] TIME COMPRESSION SIGNAL PROCESSOR

[75] Inventor: John D. Collins, Burlington, Mass.

[73] Assignee: Raytheon Company, Lexington, Mass.

[22] Filed: Mar. 29, 1971

[21] Appl. No.: 129,218

Related U.S. Application Data

[63] Continuation of Ser. No. 787,506, Dec. 27, 1968, abandoned.

[52] U.S. Cl. .................. 343/5 DP, 343/17.2 PC
[51] Int. Cl. .................... G01s 7/30, G01s 9/02
[58] Field of Search .................. 343/5 DP, 17.2 PC, 343/8, 9

[56] References Cited
UNITED STATES PATENTS

| | | | |
|---|---|---|---|
| 3,623,096 | 11/1971 | Morris | 343/9 |
| 3,333,247 | 7/1967 | Hadley et al. | 343/5 DP |
| 3,140,486 | 7/1964 | Gillmer | 343/8 |
| 3,422,435 | 1/1969 | Cragon et al. | 343/5 DP |
| 3,388,377 | 6/1968 | Folsom et al. | 343/5 DP |
| 3,386,077 | 5/1968 | Molho | 343/5 DP |
| 3,292,175 | 12/1966 | Brandon | 343/17.2 PC |
| 3,150,368 | 9/1964 | Price | 343/17.2 PC |

Primary Examiner—Malcolm F. Hubler
Attorney—Harold A. Murphy et al.

[57] ABSTRACT

A time compression system used for spectrum analysis of multi-channel digital systems in which there are X identical input channels and Y identical filters. Each input is sampled in parallel and then quantized with an analog-to-digital converter. The inputs are then stored channel by channel in a random access memory. Readout begins at the end of the sample interval and each channel is read out serially. The stored digital signals are converted back to serial analog signals and fed to a single bank of filters for spectrum analysis.

10 Claims, 13 Drawing Figures

RECTANGULAR MEMORY MATRIX

FIG. 3

$f_o$ IMS DRIVING PULSE

FIG. 4A

$f_o - 2088 K_C$ TIME RESPONSE

FIG. 4B

$f_o - 1044 K_C$ FILTER RESPONSE

FIG. 4C

$f_o$ FILTER RESPONSE

FIG. 4D $f_o + 1044 K_C$ FILTER RESPONSE

FIG. 4E $f_o + 2088 K_C$ FILTER RESPONSE

FREQUENCY   FIG. 4G

INVENTOR
JOHN D. COLLINS
BY Irving S. Rappaport
ATTORNEY

TIME COMPRESSION SIGNAL PROCESSOR

RELATED CASES

This is a continuation of application Ser. No. 787,506, filed Dec. 27, 1968, now abandoned, by John D. Collins and assigned to the same assignee as this invention.

Application Ser. No. 174,221 (continuation of Ser. No. 787,504, filed Dec. 27, 1968, now abandoned), entitled Time Compression System Adding Noise to Allow One Bit Quantization, filed Aug. 23, 1971 by John D. Collins, and application Ser. No. 99,294 (continuation of Ser. No. 787,314, filed Dec. 27, 1968, now abandoned), entitled Tome Compression Signal Processor, filed Dec. 17, 1970 by John D. Collins, both assigned to the same assignee as this application, are hereby incorporated by reference and made a part of this application.

BACKGROUND OF THE INVENTION

There is frequently a requirement for the simultaneous processing of signals from a number of channels, such as coherent radars and sonar systems with multiple antenna beams, range gates, velocity gates, etc. One prior art approach is to use an identical processor for each channel. In the radar case, the processor is generally a group of filters utilized to enhance the signal in a background of noise and clutter with narrow band filtering. If it is a wide-band system due to ranging modulation on the transmitter, a group of cross-correlation devices would replace the bank of filters. For example, velocity or frequency resolution is proportional to observation time, while range or time resolution is proportional to bandwidth. For the radar or sonar that requires high resolution in both velocity and range, a cross-correlator or range gate would be required for each antenna beam, and a bank of doppler filters is used for each range gate. Some systems in this class are: pulse doppler, FM/CW and pseudo random noise radar. The cross-correlator is a device whose output depends on time delay, while a doppler filter output is a function of the first derivative of time delay or range rate.

The total system requirement, or the number of independent bins, is the product of the number of antenna beams, range gates, and velocity filters that must be processed simultaneously. If a search mode is used in azimuth, elevation, range or velocity, the bins can be reduced by time sharing. The sensitivity is also reduced by the same factor since integrated signal energy, as compared to noise, is reduced if it is assumed that the target is illuminated continuously in time.

Time compression, a technique of parallel to serial conversion in the time domain, can be applied to any of these systems to reduce the number of processors in proportion to the compressor factor. Time compression can be used for spectrum analysis of multichannel systems to reduce the number of filters and the analysis time. Some prior art methods utilize analog recording on magnetic tape, film, or drums. Generally speaking, time compression is accomplished by reading the stored data out at a faster rate than it was stored. Prior art time compression systems include the Deltic, which is a delay line time compressor, and a coherent memory filter. These devices can be used to perform a spectrum analysis of a single channel effectively without the need for a large number of parallel filter channels. However, these devices are not adapted for present coherent radars and multi-channel processor systems. One prior art time compression system uses a special transfluxor memory array as opposed to a standard random access memory as used by the present invention. In addition this prior art system employs analog samples from a single signal source while the present invention utilizes digital samples from a plurality of signal sources.

A coherent radar system capable of tracking several targets at once, or alternately capable of searching for an unknown target at an unknown distance, contains a large number of channels, or receivers, each tuned to a different distance. As the radar acquires real or false targets, these receivers continually produce signatures--unusual or even unique frequency patterns that have to be analyzed to determine the various targets' velocity, acceleration, and other characteristics. The analysis, in general, must be performed as fast as the signals come in; recording the signatures for later analysis won't help if the targets are capable of destroying the radar.

Without time compression, the only way to keep track of all the targets in real time is to attach to each channel a complete processor consisting of a bank of narrowband filters and an associated computer. This approach is too expensive and entails too much equipment when more than a few channels are involved. Some radar systems have been designed around multiple processors, but all these networks are relatively large and complex.

SUMMARY OF THE INVENTION

If a system were just a single channel, but many range or velocity bins were to be analyzed, and the requirement was to use only one gate, the time compressor would record the signal and play it into the gate many times faster than real time, such that every desired bin product of number channels and the number of filters per channel is examined by the gate in sequence. While the signal is being read out of the storage medium at this faster rate on a continuous basis, the input is not being recorded, resulting in a loss of signal energy depending on the ratio of record and process times. The required compression ratio is equal to at least the number of separate bins that must be examined in sequence if a single gate is time shared. If two or more gates are used, the compression ratio can be reduced in proportion. Generally, the compression ratio is made high enough to reduce lost data. Two time compression signal processors can be used with one processing while the other is recording but this doubles the storage required.

A more common system solution is the case where there are, for example, M input channels and P gates required for each channel. The product MP might typically be many thousands, and time compression by this factor to allow a single gate is usually not practical since the signal bandwidth is also increased by the compression factor. Compression by M, the number of channels, is usually a good choice since a single bank of P gates can be time shared among M channels. Another reason for this particular choice is that the signals stored in the memory for each channel need be used only once and discarded. For example, if P/2 filters were used, only half the signal range or, in effect, half a channel could be examined at a time. In memories that are destructive readout, or erase before record, there is a loss in speed of operation by a factor of two.

With analog memory, the signals are recorded continuously in time and all levels of amplitude are retained within the degree of fidelity of the device. This is an inefficient way of using a memory, since sampling theory allows signals to be represented by instantaneous samples (as narrow in time as desired) taken at discrete times to represent the signal with sufficient quality for most practical purposes. This allows the samples to be stacked closer together than they originally existed. The practical limit is bandwidth, since the narrower the sample, or pulse, the greater the bandwidth.

Another advantage of sampling is that it allows many operations to be interlaced in time and, yet, have, in effect, many simultaneous operations with the same memory. If the memory is random access, the samples can be rearranged in any fashion desired within practical limits of the device.

Digital computer technology has developed, and is still developing, random access memory devices that are capable of high-speed operation, allowing time compression by closely stacking samples or a rearrangement of the order from which they were originally recorded. Magnetic cores in a three-dimensional matrix is just one example of a random access device that is economical and reliable because of extensive development and usage. It also has the advantage of high-speed and all-electronic operation.

Although analog samples can be stored in some types of memories, a more reliable approach is binary or two-level memory, since far greater manufacturing and environmental tolerances are possible in order to determine one of two levels rather than a range of levels. Conventional analog-to-digital conversion techniques can be used to convert the samples to a group of N binary levels. The number of permissible levels without interpolation is $2^N$ where N is the number of bits (0 or 1) per sample. Binary memory requires the use of N times as many memory elements as analog memory in addition to an analog-to-digital converter and a digital-to-analog converter at the output to reconstruct the analog sample.

If the signals are narrow band in comparison with noise, clutter, or random signals, and are small in amplitude as compared to the noise, clutter and other wide-band random signals, a special form of zero crossing limiting occurs when only polarity samples are stored such that the signal information is retained as if analog samples were stored, except for a small loss in signal-to-noise and clutter ratio.

This special case is useful in radar and sonar systems where signals are, in effect, buried in relatively wide-band noise and clutter. A further advantage is that the noise and clutter voltage is held constant independent of the gain of devices prior to the time compression sampler, allowing a constant false alarm rate (CFAR) to be obtained with a fixed voltage threshold at the detector.

An analogous digital approach to analog time compression as described in the present invention is to sample, quantize (coded), and store the analog signals followed by the inverse process. Time compression is accomplished by making the read out rate greater than the sampling rate. There are X identical input channels and Y identical filters. Each input is sampled in parallel during the sampling time and coded with PCM. Each gate is a sample-hold circuit. The sample taken is quantized with the A-D (analog-digital) converter and stored. Next a sample is taken of the adjacent channel and it is stored, followed by the next channel, etc. The sampling is done at a rate equal to at least twice the channel bandwidth. Only a single A-D converter is usually required since its operating speed is so much greater than the required sampling rate. In other words, the bit rate must be high enough to code all channels during one sample period such that only one channel is being sampled at a time, but each is sampled at a rate equal to at least twice the bandwidth. The sample time is determined by the desired predetection bandwidth.

The memory accepts one sample signal from each of several radar channels in turn. After several passes across all the channels, the stored samples from the first channel are read out in a continuous stream, then all the samples from the second, and so on. Thus, samples taken at, for example, milliseconds are read out in microseconds and appear to have been compressed in time. A digital-analog converter is used to convert the stored digital data to a serial analog signal. The information is then broken down into frequency components by a filter bank and analyzed by a computer to determine the range and velocity of various targets. This block readout, channel by channel, enables one filter bank to work on a time-shared basis. And because time compression raises the audio signal frequencies by a large factor, they can be analyzed by smaller and less expensive components.

The time compression signal processor of the present invention is characterized by the following features and advantages as well as others: (1) A central high-speed random access memory is used for time compression and other functions on a time-shared basis. (2) The program used permits more flexible and efficient operation than other techniques for time compression. (3) Intermittent real-time processing is accomplished. (4) Time compression permits many channels to be processed simultaneously with a single processor. (5) Digital memory is used with analog-to-digital conversion during writing and the same device used in reverse, digital-to-analog during readout to accomplish inherent unity gain. (6) The number of quantization levels may be selected. (7) The voltage levels of the binary quantization levels are adjustable allowing a wide variation of input amplitude while retaining the maximum bits of quantization with the adjustment of a single resistor. (8) An automatic gain control system could be incorporated to adjust the quantization during analog-to-digital conversion to match the signal while it could be a fixed level during ditigal-to-analog conversion. (9) Since a random access, core memory is used for time compression, storage and time can be made available for other functions such as digital integration, bright display, etc. (10) Digital integration using memory words on a random access basis are instrumented. Integration is only performed when the first threshold has been exceeded. (11) Automatic target tracking is accomplished by updating the address of the target alarms as the position of the target changes with time. (12) A random access raster is contained in the memory for temporary or permanent storage. It is read out to remote indicators at a high rate to produce a bright, fleckerless pattern.

The above objects, advantages and features of the present invention, as well as others, are accomplished by providing a time compression signal processing system used for spectrum analysis of multi-channel systems, the system comprising means for sampling the incoming signals one channel at a time; means for time compressing the sampled signals including random access memory means for storing the input signals, spectrum analyzing means for analyzing the signals, the analyzing means including a single filter bank operating on a time-shared basis, means for computing the desired data and means for displaying the data. The random axis memory means may be a conventional memory and associated timing circuitry such as, for example, that disclosed in Chapter 22, pages 397–410, of the textbook "Digital Computer Principles" published by the McGraw-Hill Book Company, Inc. in 1962, Library of Congress Catalog Card Number 62–13207. The spectrum analyzing means may be, for example, a conventional bank of crystal filters referred to in greater detail in the publication entitled "Putting the squeeze on radar signals" in Electronics Magazine of Jan. 22, 1968, pages 86–94.

BRIEF DESCRIPTION OF THE DRAWINGS

FIG. 4 A-4G shows the waveforms resulting from the operation of the filter bank shown in FIG. 1;

DESCRIPTION OF THE PREFERRED EMBODIMENTS

Time Compression Signal Processor

Figure 1:
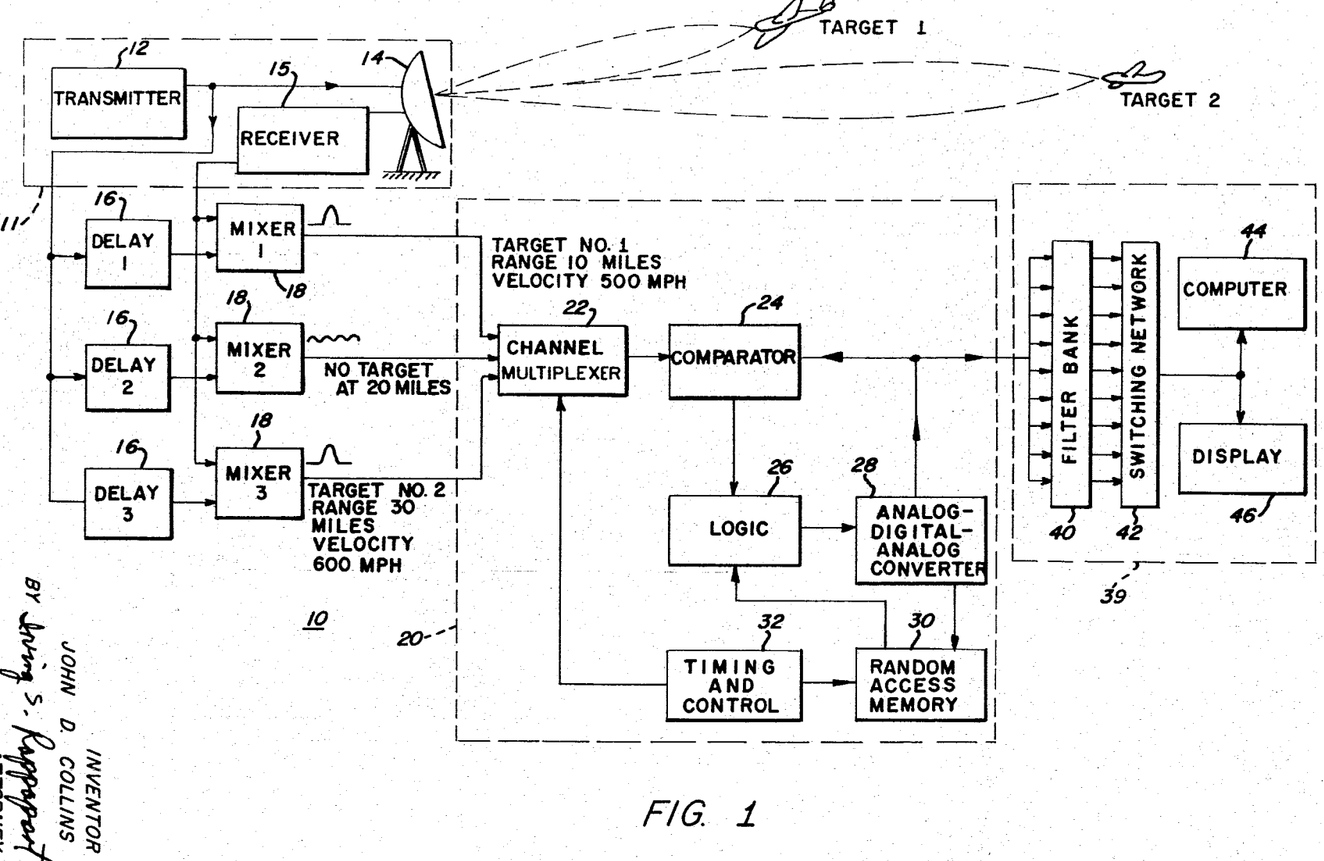
FIG. 1 is a block diagram embodying the time compression signal processor of the present invention.

FIG. 1 shows a time compression signal processing system 10 utilized in conjunction with a coherent radar system, shown in dotted block 11, capable of tracking several targets at once, or alternately capable of searching for an unknown target at an unknown distance. For purposes of explanation, the radar system shown in dotted block 11 contains three channels 1, 2 and 3, but a larger number of channels may be employed. Each of the channels is tuned to a different distance and, as the radar system 11 acquires real or false targets, these channels continuously produce signatures in the form of unusual or even unique frequency patterns which must be analyzed to determine the velocity, acceleration, and other characteristics of the various targets. In general, the analysis must be performed as quickly as the signals are received, since recordation of the signatures for latter analysis will not be beneficial if the targets are capable of destroying the radar system.

The input for the time compression signal processing system 10 comes from the coherent radar system 11 including a transmitter 12 and a transmitting/receiving antenna 14 which sends out a signal and receives an echo out of phase with the transmitted wave on a receiver 15. The system in FIG. 1 shows targets 1 and 2 at different distances from the transmitter 12 and the dotted lines and arrows indicate the path of the transmitted signals and the received echo signals. For all but very short ranges, the phase difference between the transmitted signal and the received echo signal is more than one wave length. A non-coherent radar is sensitive to amplitude only, not phase.

The transmitted signal from the transmitter 12 passes through one or more delay units 16 in parallel with the transmitting antenna 14. Each delay unit 16 shown for each of the channels 1, 2 and 3 inserts a time interval equivalent to an integral number of wave lengths, and the phase difference is measured between the echo signal and the delayed transmitter signal. The amount of delay then yields a gross indication of the target's distance and the phase difference provides a more accurate indication of the target's distance. Each delay unit 16 corresponds to a large increment of range or distance and each delay unit 16 and its associated circuitry including a mixer 18 comprise a separate radar channel. Each of the mixers 18 has as an input the delayed transmitted signal from its corresponding delay unit 16 and the received echo signal from the receiver 15.

As a target moves toward or away from the radar system 11, the phase difference keeps changing. As peaks in the received signal successfully coincide with peaks and valleys in the transmitted signal, the phase difference itself acquires peaks and valleys, creating a difference frequency. The radar signals themselves are measured in gigahertz and the difference frequency usually in kilohertz. When the radar system 11 remains locked onto a single target, only one difference frequency is of interest and variation in this frequency corresponds to variations in the target's velocity. However, when several targets are in the radar beam, or when the radar searches for an unknown target, the system 11 keeps track of difference frequencies for each range. As an example, if the radar system has a range of 100 miles and a resolution of one mile, it must have 100 different channels. One channel looks for difference frequencies from one mile away, another channel for targets two miles away, and another one for three miles, etc.

The outputs from each of the mixers are applied in parallel to time compression circuitry shown in dotted block 20. The technique of time compression by a factor of the number of input channels can be demonstrated with the aid of FIG. 2. Only 3 channels are shown, but the technique may easily be extended to M channels with a compression factor of C. Only the sample points are shown for each of the channels, and the original and reconstructed wave forms for clarity but either analog or N bit quantization could be used. The samples are taken on a continuous basis from each channel in succession at a rate somewhat greater than twice the bandwidth of the individual channels. For example, all channels would have the same bandwidth, or at least the sampling is based on the channel with the greatest bandwidth, although there is a certain amount of flexibility in using different sampling rates for different input channels in integral multiples.

Figure 2:
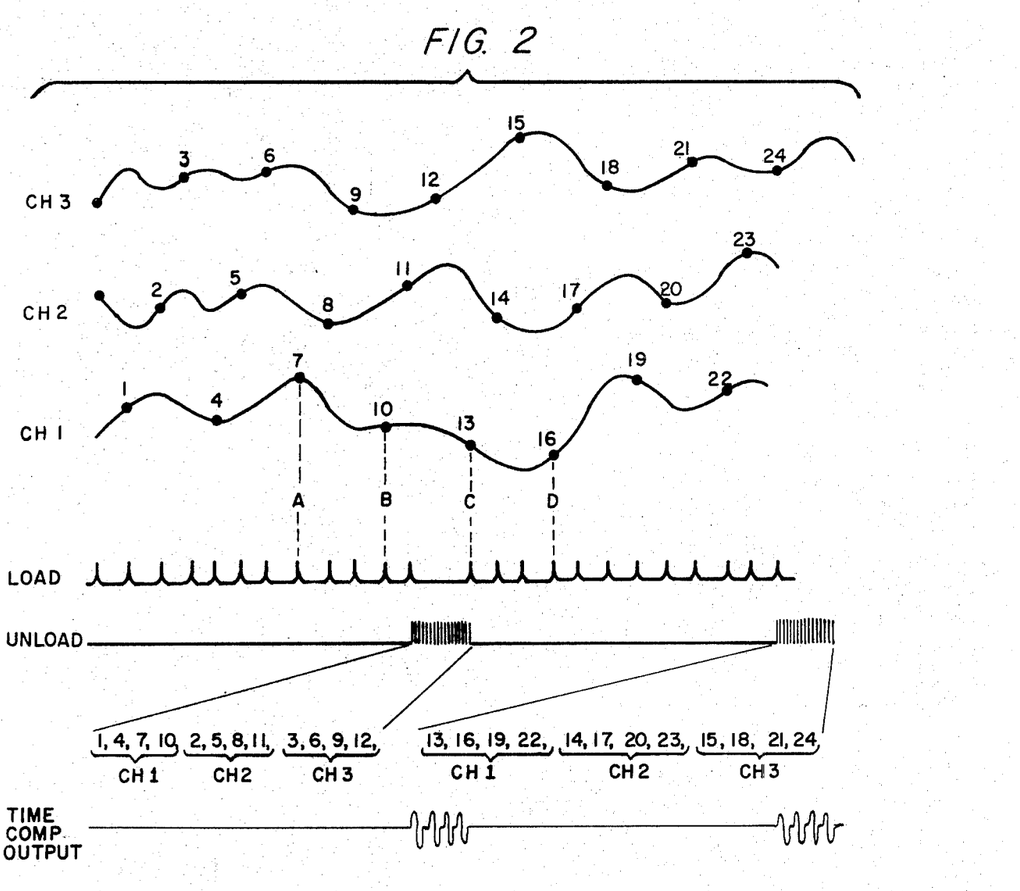
FIG. 2 shows waveforms illustrating the technique of time compression.

The time compression circuitry 20 includes a channel multiplexer 22 which receives the signals from each of the radar channels. The multiplexer 22 samples the signals from each of the channels rapidly in succession and applies the signals to a comparator 24. The output of the comparator 24 is applied to logic circuitry 26 whose logic instructions are applied to a combined analog-to-digital and digital-to-analog converter 28. Since radar echoes are analog signals, they must be converted to digital form to be stored in the memory 30 and then converted back to analog form when being read out for analysis. Since the loading and unloading are completely time separate operations as seen in FIG. 2, a combined analog-digital-analog converter 28 may be employed. A random access memory 30, which for purposes of discussion of the embodiment of the invention in FIG. 1 is a three-dimensional random access core memory, is coupled to the converter 28. Timing and control circuitry 32 is coupled between the memory 30 and the multiplexer 22.

The time compression circuitry 20 fills the core memory 30 with samples from the various channels and then shuts off the input while the samples are read out to a filter bank 40 channel by channel. The output signals from the time compression circuitry 20 are applied to a spectrum analyzer 39 which includes the filter bank 40, a switching network 42 to which the filter bank 40 outputs are applied, a computer 44 and a display 46. The size of the memory 30 is determined by the number of channels, M, the channel sample rate SB, and the amount of time, T, the computer 44 requires to process all the data in one channel. Thus, SBT samples are taken from each channel with each cycle of processing and the capacity of the memory 30 must be at least SBMT samples.

The most difficult part of using the compression techniques in a radar system is the discovery of an addressing scheme that allows the economical use of the storage at an adequate speed. The operation of a core time compression system utilized in the embodiment of the invention shown in FIG. 1 depends on the ability of the computer 44 to process the data in the memory 30 at a speed considerably faster than the data's arrival rate.

Therefore, the computer 44 has a speed which is C times the data rate so that the computer 44 can analyze M channels.

The simple three channel system shown in FIG. 1 illustrates the principle of time compression as applied in the present invention. The channel multiplexer 22 connects channel 1 to the core memory 30 through the analog-to-digital converter 28. The time compression circuitry 20 takes one sample from channel 1, converts it to digital form in converter 28 and then stores it in core memory 30. Then a sample is taken from channel 2, it is converted in converter 28 and stored in memory 30. This process is then repeated for channel 3. After the first sample from channel 3 has been stored, the second sample from channel 1 is taken. The sampling rate of each individual channel is at least twice the highest frequency of the signal in that channel or otherwise, the reconstruction signal might contain spurious frequencies and thus not truly represent the original signal. When the memory 30 has collected many samples from each channel, the information from channel 1 is passed through logic circuitry 26, is converted back to analog form by converter 28 and is then applied to the filter bank 40 of spectrum analyzer 39. Samples from channels 2 and 3 are similarly analyzed and computer 44 determines the position and speed of the target from the output of the filter bank 40. The readout is much faster than the readin, the ratio of readout rate to readin rate being a multiplying factor C that adjusts the analysis to compensate for this speed change.

MEMORY

Again, considering FIG. 2, the samples are loaded (written in) or placed in the memory 30 at an appropriate location such that they can be later retrieved in order from a given channel. The samples 1, 4, 7 and 10 from channel 1 were read out of the memory at a C times faster rate with the unload (readout) signal. The load and unload commands derived from timing and control circuitry 32 are time shared and the memory rate varies with the load and unload rates. If the memory 30 had excess speed and storage capability other functions could be interlaced in time. If it was desired to time compress by a factor of 2 times the number of channels, the unload rate would simply double and each couple of samples would be fed back to the memory 30 and read out again. Compression by less than the number of channels can be accomplished by having more than one output. In this way the memory can unload more than one sample simultaneously.

This flexibility is useful in systems where the compression ratio becomes higher than is practical and desirable. If the memory load rate is also higher than desired, more than one sample can be introduced in parallel in a similar fashion to reduce the memory load rate.

In understanding the present invention it should be shown how a memory with a geometry in the form of a plane or rectangle can be used for time compression. Other geometrys such as lines, cylinders, disks, etc., are also useful, the limitation of the memory being the speed and method of access. Random access of a memory is defined as the ability to load or unload a sample at any given location or address in a given period of time. As an example of a time compressor with a random access rectangular memory matrix, refer to FIG. 3. This could be an array of magnetic cores so commonly used in computer systems, but it should be noted that any random access memory can be used for time compression.

Figure 3:
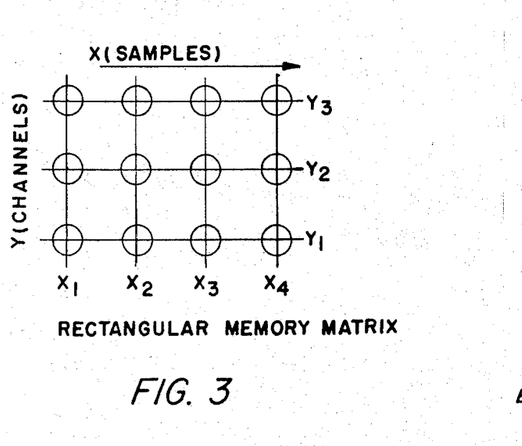
FIG. 3 shows a random access rectangular memory matrix.

In FIG. 3, there are twelve unique addresses: $X_1 Y_1$, $X_1 Y_2$, etc. The time compression as shown in FIG. 2 can be accomplished with the matrix of FIG. 3 by loading in the Y direction, bottom to top, and left to right in sequence and unloading from left to right, bottom to top, in the X direction such that sample 1 from channel 1 is placed in $X_1 Y_1$ and sample 1 from channel 2 is placed in $X_1 Y_2$; sample 1 from channel 3 in $X_1 Y_3$, and sample 2 from channel 1 in $X_2 Y_1$; sample 2 from channel 2 is placed in $X_2 Y_2$, etc. Unloading is done at right angles, or orthogonal to loading, in order to place all the samples in a given channel in sequence, whereas loading was done on a channel-to-channel basis. Therefore, to unload samples 1, 2, 3 and 4 from channel 2, etc., and repeating channel 1 after channel 3, etc., it is necessary to unload, $X_1Y_1$, $X_2Y_1$, $X_3Y_1$, $X_4Y_1$, $X_1Y_2$, $X_2Y_2$, etc.

Random access addressing allows loading in one direction and unloading in the opposite direction, in addition to other advantages to be discussed subsequently. The various parameters of time compression are:

M = Number of input channels
B = Bandwidth of each channel
S = Sample factor
P = Number of bins per channel
T = Processing time (load time)
C = Compression ratio The processing time T is reduced by the compression factor C in the example. The memory capacity is:

$$\text{Memory Capacity} = SBMT \quad (1)$$

since samples are taken at a rate SB from M channels for T seconds. The memory load rate is SBM and the memory unload rate is SBMC. The compression ratio C can be chosen to make the unload time equal to, greater, or less than the load time T.

In the example, the memory capacity was 12. Typical systems might require capacities in the tens, hundreds of thousands, or even millions. The length Y is equal to the number of channels, and X is equal to the number of samples per channel. With a change in the addressing program, more than one line could be assigned to each channel, reducing the length of the X or Y at the expense of the other. A memory such as a core memory is word addressed, that is, only a single word can be either loaded or unloaded at a time. The rate is held to practical limits.

A data rate problem can exist for two distinct reasons. First, the input samples may exist at a rate greater than the memory load rate. Second, the unload word rate may not be fast enough to allow the desired compression factor. The first situation (sample rate greater than memory load word rate) can be improved by loading more than one sample at a time. The sample rate can be greater than the word rate of the memory by factors of the number of samples per word. The second problem (memory unloaded word rate not great enough for the desired compression) can be eliminated by programming the memory with more than one sample per word. The word is unloaded at the memory word rate into a shift register that allows a parallel to serial conversion and a signal speed up equal to the number of samples from a given channel contained in the word.

Ten Channel Time Compression System

One core time compression system employing the present invention which has been built has 10 channels (not shown), corresponding to the radar systems' ability to detect targets at 10 different distances. Within each channel, the band of detectable frequencies ranges from 200 to 900 hertz, corresponding to the velocity limits of the targets picked up. Each channel is sampled at a 2-kilohertz rate. An adequate sampling rate would be 1.8 Khz, twice the highest signal frequency of 900 hz, but a 2-khz rate offers a margin of safety. After each sample is converted into digital form, it's stored in a memory location corresponding to the sampled channel. The samples for all 10 channels come from a 20-khz oscillator, so that each sample is wide enough—50 $\mu$sec to allow plenty of time for the conversion process and storage cycle to continue.

The compressor samples the channels for 300 msec, collecting 600 sample words from each channel. The MSBT product is (10) (2.22) (900) (0.3) = 6,000 meaning that the memory must be capable of holding 6,000 samples. The rate at which the stored information is transferred from the channels to the filter bank and thence to the computer is one msec per channel, so that the compression factor C is 300 to 1. Because of this speeding up, the output frequency band, 60 to 270 khz, appears to be 300 times as high as it really is.

Aside from this factor of 300, the one msec signal from each individual channel is a stepwise approximation of the original analog input. Added to this compressed signal is a five Mhz carrier frequency to permit the use of standard crystal filters instead of the much larger and more expensive kilohertz-band filters. Thus, the actual frequency band analyzed by the filter bank is 5,060 to 5,270 khz. Difference frequencies - 4,730 to 4,940 khz, duplicating the information in the sum band are also present, outside the filter range.

Filter Bank

Because the signal from a specific channel can be quite complex reflecting several targets traveling at different speeds or a single target moving erratically—the difference frequency must be broken down into its various components. This is conveniently done by a bank of narrowband filters, each of which isolates a single component frequency from the received signal.

Suppose an individual channel picks up targets moving at speeds between 100 and 500 miles per hour at a range of 50 miles. The signal from this channel could be analyzed by a bank of, for example, 40 filters, one of which would produce an output if the difference frequency indicated the presence of a target traveling at between 100 and 110 miles per hour, another indicating a target velocity of 110 to 120; the next, 120 to 130, and so on. The 40th filter's output would correspond to a speed between 490 and 500 mph.

These filters by themselves cannot indicate whether a target is moving toward or away from the radar antenna, but the doppler effect can. The echo from an approaching target will be at a higher frequency than the transmitted signal, and at a lower frequency if the target is moving away. This effect, together with the output of the filter bank, gives complete information about the target's radial motion.

A target moving toward the receiver at a constant velocity generates a constant difference frequency that produces a steady output from one filter in a single channel. As the target comes closer to the receiver, the signal switches from channel to channel, producing outputs from corresponding filters in successive channels.

Most targets, however, don't move at constant speeds. They may, for instance, have transverse components; the radar can track only the radial velocity component. Even if the target is moving along an oblique line, the radial component changes only gradually in proportion to the cosine of the angle between the target's path and the line of sight. Or the target may be tumbling or rolling; as parts of it move at different velocities, a frequency modulation is set up in the different signal.

As the target's velocity changes, its frequency—as produced by the radar changes. This frequency variation plotted against time yields the target's signature, by which, for example, various satellites in orbit around the earth can be identified.

In the 10 channel core time compression system described above, the compressed band is analyzed by a bank of 200 bandpass filters with center frequencies equally spaced at 1.05 khz intervals and output-versus-frequency curves resembling the Gaussian, or bell-shaped, distribution. Filters with more nearly rectangular characteristic curves would be better suited for straightforward spectrum analysis, but part of the problem in a radar system is extracting the signal from a noisy background; Gaussian filters were better at extracting the signal.

The center frequency of each filter corresponds to a particular velocity of a target, and the filter with the maximum output therefore indicates the velocity. To assure that the outputs from the filter bank are as large as possible, even for frequencies between the center levels, the filter bandpass characteristics overlap. The bandwidth of each filter-measured between frequencies where the output is three decibels below that of the center frequency—is greater than the spacing between the center frequencies. Thus, the depth of the valley between adjacent peaks is only 2 db and no frequency is attenuated more than 2 db.

Figure 4A:
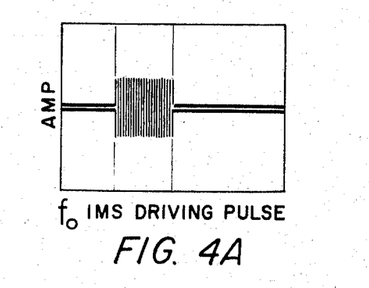
Figure 4B:
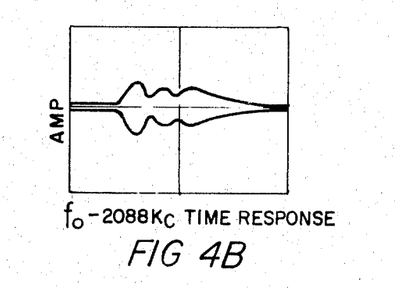
Figure 4C:
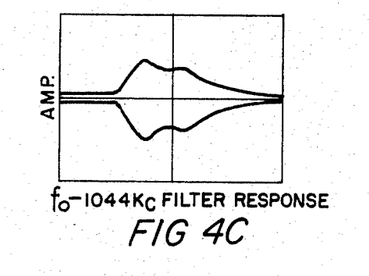
Figure 4D:
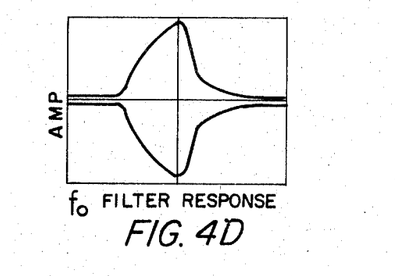
Figure 4E:
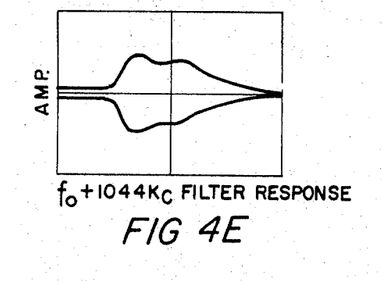
Figure 4F:
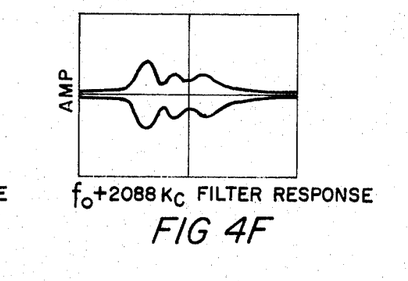

A one-msec pulse of a single frequency is shown in FIGS. 4A-G with the outputs of five adjacent filters, one at the specific frequency $f_o$ and the two closest 1044 and 2088 KC at higher and lower frequencies. These displays are of amplitude against time. FIG. 4A shows the 1-msec driving pulse of the high-frequency compressed signal. The time constant of the center filter's response to the input pulse is clearly visible in FIG. 4D, and the similar, though more complex, responses of the side filters are also apparent in FIGS. 4B, C, E and F. These side filters produce outputs because the fast rise and fall of the single-frequency input signal create many other frequency components. As the filters are sampled in sequence, while the 1-msec pulse is applied to their inputs, their outputs appear as pulses as shown in the amplitude versus frequency plot in FIG. 4G.

The total frequency content of the signal follows the curve $y = (\sin x)/x$, which resembles a damped sine wave. The duration of the input pulse determines the spacing between the local maxima of this curve; for a one msec pulse, the peaks are one khz apart, very nearly the same as the spacing of the various filters' center frequencies. This accounts for the outputs of the side filters. These outputs drop off rapidly, however, mostly because of the descreasing amplitude of the successive peaks in the $(\sin x)/x$ curve.

Figure 4G:
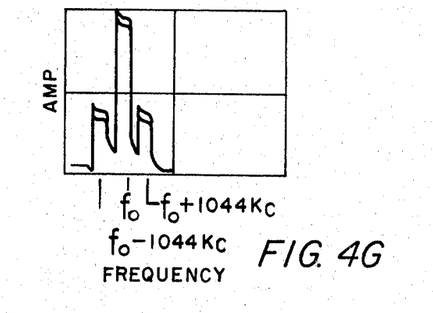

When the filter outputs are sampled in sequence at 1 $\mu$sec intervals, the response takes the form shown in FIG. 4G. Although side lobes are still present, the input is essentially continuous when compared to the sweep frequency. The outputs of the filters adjacent (+ and − 1044KC) to the center filter are strongly attenuated, and the outputs of the next two are barely visible in this display. Other filters further removed from the main frequency produce no visible output at all.

Channel Multiplexer

In the prototype digital time compressor, a multiplexer such as 22 in FIG. 1 generates sample pulses at a frequency of 20 khz and distributes them in rotation to the 10 channels, so that each channel is sampled at a 2-khz rate. The system contains a 20 khz clock, a binary counter, a binary-to-decimal decoder, (not shown) and 10 analog gates to do the actual sampling. The trailing edge of each clock pulse steps the counter whose output is decoded to open a gate for the next clock pulse and to direct that pulse to the next channel.

Figure 5:
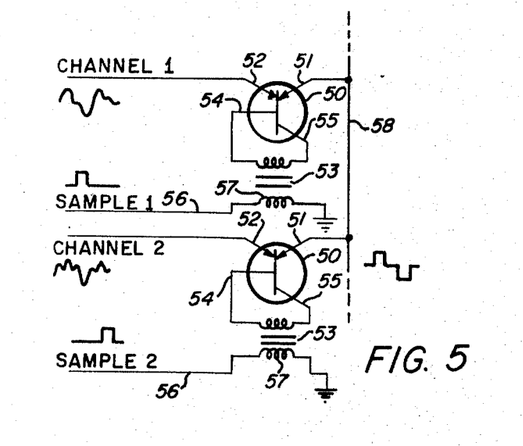
FIG. 5 shows the details of the analog gates used in the channel multiplexer shown in FIG. 1.

The analog gates shown in FIG. 5, which are similar to transistor chopper circuits, each contain a dual-emitter transistor 50 having emitter 51 and 52 with a transformer 53 connected to its base 54 and collector 55. A sample line 56 connects the transformer primary winding 57 to the decoder output. When a positive pulse appears on line 56, both emitters 51 and 52 are forward biased and the transistor 50 admits the level of the analog voltage to the common output line 58 with hardly any change.

Converter

Figure 6:
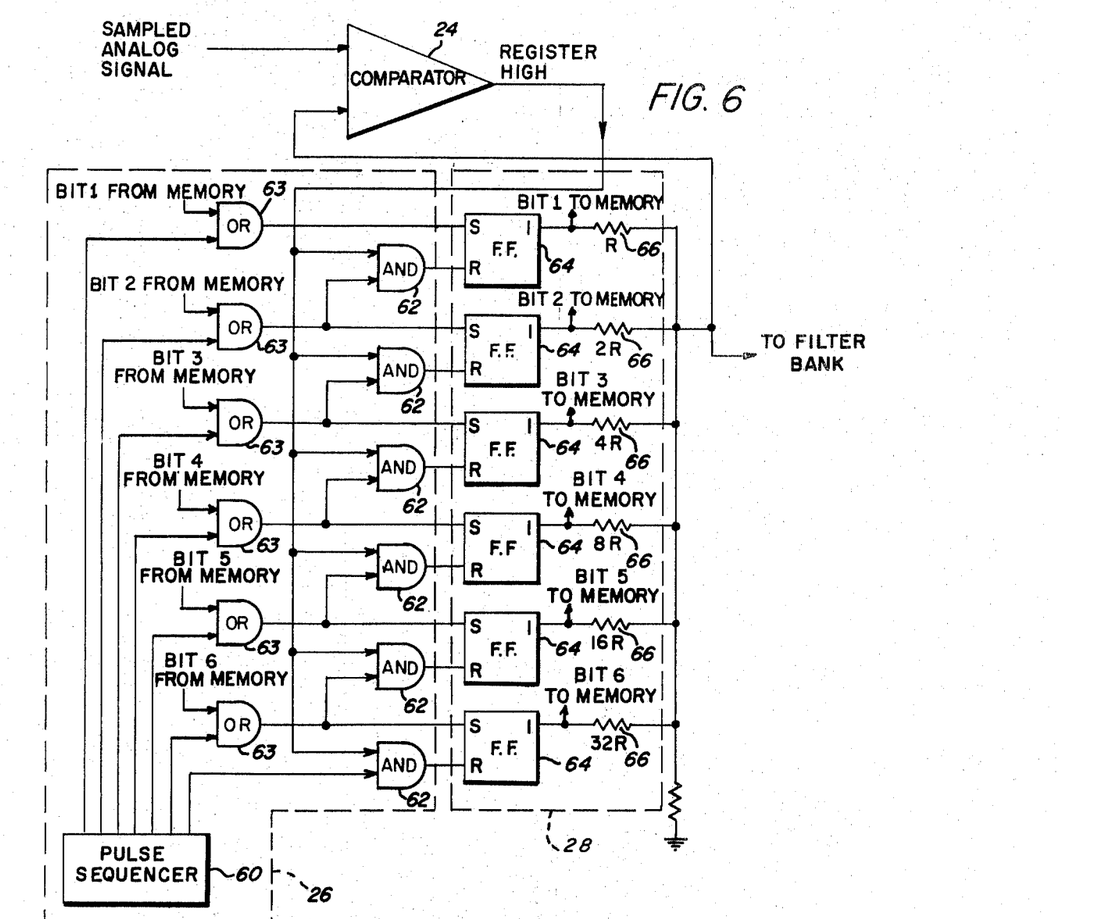
FIG. 6 illustrates a schematic diagram of the analog-digital-analog converter shown in FIG. 1.

The converter 28 used in the 10 channel core time compression system described above is shown in FIG. 6. Converter 28 is a six position register whose outputs are added together in a resistor network. The logic circuitry 26 includes a pulse sequencer 60 whose output is applied to six parallel-connected AND gates 62 and six parallel-connected OR gates 63. Each of the OR gates 63 also receives a input from the memory 30 as shown. In addition, the output from the comparator 24 is also applied to each of the AND gates 62. The outputs from the AND gates 62 and the OR gates 63 are applied to a digital-to-analog converter 28 which includes six parallel-connected flip-flops 64 and resistors 66. A separate flip-flop 64 is connected to the output from each of the AND gates 62 and also receives a signal from the pulse sequencer 60. A resistor 66 having a relative resistance value shown in FIG. 6 is connected to the output of each of the flip-flops 64. The resistors 66 are all connected in parallel and the output derived therefrom is applied to both the input of the comparator 24 and to the filter bank 40.

A digital quantity in the converter 28 is made to agree with the sampled analog quantity in the comparator 24 by the following method of successive approximations. First, the flip-flop 64 corresponding to the most significant digit (bit 1) turns on, and the analog output of the network is compared in comparator 24 with the analog wave shape being sampled. This comparison is made in a digital-output differential amplifier similar to the sense amplifier generally used with computer memories. If the comparison generates a zero, the digital value is smaller than or equal to the analog value and thee high-order (BIT 1) flip-flop 64 is left on. If the comparison generates a one, this flip-flop is turned off. Either way, the flip-flop 64 corresponding to the next most significant digit (BIT 2) is turned on and the above comparison is repeated. The converter 28 makes six comparisons for the six flip-flops 64 in the register in approximately 6 $\mu$sec. When this is accomplished, the contents of the converters 28 are transferred to the memory 30 as the binary value of the analog wave shape.

In the memory used in the 10 channel system being described, a conventional coincident—current ferrite-core stack with a 1.25 $\mu$sec cycle time is employed in which 8,192 words of six bits each can be stored. The timing and control circuitry 32 which controls the reading, writing, and addressing is slightly modified for the memory stack's application in the time compression circuitry 20.

A new sample from any single channel is stored every 500 μsec. For readout all the samples from each channel are transferred from the memory 30 one by one to the same converter 28 via logic circuitry 26. The logic circuitry 26 is designed so that successive numbers can be transferred in on top of previous ones without any need for resetting. The resistor network produces the analog equivalent of the successive samples every 1.67 μsec. The network's output thus approximates the input waveform for each channel, except that it appears in steps instead of continuously and its frequency components are multiplied by 300. At this point, the 5 Mhz translating frequency is added and the sum is passed to the filter bank 40 for analysis.

If the input signals were already available in digital form, the analog-to-digital conversion would not be required. Similarly, if digital filters were employed in the filter bank 40, the output digital-to-analog conversion would not be required.

Timing and Control

Figure 7:
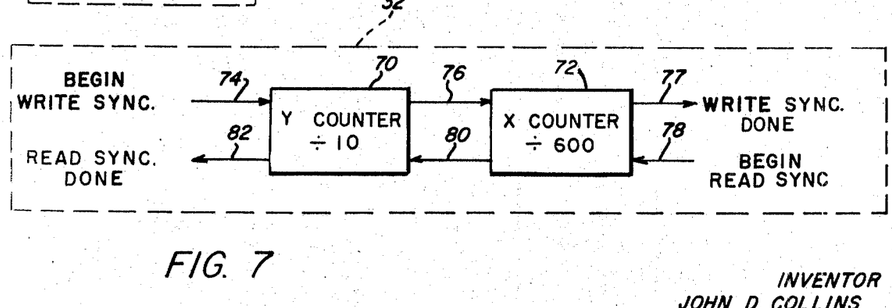
FIG. 7 presents the timing and control circuitry of FIG. 1 in greater detail.

FIG. 7 shows the timing and control circuitry 32 used in controlling the reading, writing and address selection. The circuitry 32 includes a Y counter 70 whichh is a divide by 10 counter connected in series with an X counter 72 which divides by 600. These counters 70 and 72 are used to address the X and Y axes of the three-dimensional random access core memory 30. In the writing operation, a beginning write sync signal is applied on a line 74 to Y counter 70. The output from the Y counter 70 is applied on line 76 to X counter 72 where the signal is divided by 600. The output from X counter 72 on line 77 indicates that the writing cycle has been completed. To initiate the reading operation, a read sync signal is applied on a line 78 to the X counter 72 where the signal divides by 600. The output from the X counter 72 is applied on line 80 to the Y counter 70 which divides the signal into 10 increments. The signal output from Y counter 70 on line 80 signifies that the reading operation has been completed.

I claim:

1. In combination:

a plurality of signal input channels;

means comprising a channel multiplexer fed by signals derived from said input channels for combining said signals and for supplying signals derived from said combined signals to a common channel;

means comprising data storage means for storing signals derived from said common channel in a predetermined time sequence and at a first predetermined rate and for deriving said data from said memory in a time sequence different from said first time sequence; and means fed by said data deriving means for separating signals derived from different components of said data into different output channels.

2. The combination in accordance with claim 1 wherein the digital signals read out of said memory are converted to analog signals.

3. The combination in accordance with claim 2 wherein said signal separating means comprise a plurality of frequency responsive filters feeding separate filter output channels and responsive to different frequency bands.

4. The combination in accordance with claim 3 wherein the outputs of said frequency responsive filters are fed through said output channels to a switching network.

5. The combination in accordance with claim 1 wherein said signal channels are derived from a receiver of radiated waves.

6. The combination in accordance with claim 5 wherein said radiated waves are transmitted to a target and reflected therefrom to a receiver.

7. The combination in accordance with claim 6 wherein the sequentially sampled output of said filters is visually displayed.

8. The combination in accordance with claim 1 and a transmitter for transmitting radiated waves in a predetermined format and a receiver for receiving waves derived from said transmitted waves and for supplying signals derived from said waves to said input channels.

9. The combination in accordance with claim 1 and a receiver fed by antenna means for receiving waves transmitted by a transmitter and reflected by an object for supplying signals to said input channels.

10. The combination in accordance with claim 9 wherein said channels comprise mixers fed by reference signals derived from said transmitter.

* * * * *